US012061090B2

(12) United States Patent
Qin et al.

(10) Patent No.: US 12,061,090 B2
(45) Date of Patent: Aug. 13, 2024

(54) VEHICLE REPOSITIONING ON MOBILITY-ON-DEMAND PLATFORMS

(71) Applicant: Beijing DiDi Infinity Technology and Development Co., Ltd., Beijing (CN)

(72) Inventors: Zhiwei Qin, Mountain View, CA (US); Yan Jiao, Mountain View, CA (US); Xiaocheng Tang, Mountain View, CA (US); Hongtu Zhu, Beijing (CN); Jieping Ye, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 360 days.

(21) Appl. No.: 17/058,571

(22) PCT Filed: Jul. 10, 2020

(86) PCT No.: PCT/CN2020/101403
§ 371 (c)(1),
(2) Date: Nov. 24, 2020

(87) PCT Pub. No.: WO2022/006873
PCT Pub. Date: Jan. 13, 2022

(65) Prior Publication Data
US 2022/0187084 A1    Jun. 16, 2022

(51) Int. Cl.
*G01C 21/34*       (2006.01)
*G06N 3/08*       (2023.01)

(52) U.S. Cl.
CPC ........... *G01C 21/3461* (2013.01); *G06N 3/08* (2013.01)

(58) Field of Classification Search
CPC ............ G01C 21/3461; G01C 21/3438; G01C 21/3446; G06N 3/08; G08G 1/096833; G08G 1/202
See application file for complete search history.

(56) References Cited

U.S. PATENT DOCUMENTS 8,649,899 B2 *   2/2014   Wurman ................ B65G 1/137
                                                                       700/216
10,126,138 B1 *   11/2018   Farmer ............. G01C 21/3438
(Continued)

FOREIGN PATENT DOCUMENTS

CN        106548645 A      3/2017
CN        109084798 A      12/2018
(Continued)

OTHER PUBLICATIONS

Webb "To Ensemble or Not Ensemble: When does End-To-End Training Fail?" Jun. 29, 2020 (Year: 2020).*
(Continued)

*Primary Examiner* — Thomas Ingram
*Assistant Examiner* — Michael J Herrera
(74) *Attorney, Agent, or Firm* — Sheppard Mullin Richter & Hampton LLP

(57) ABSTRACT

Deep reinforcement learning may be used for vehicle repositioning on mobility-on-demand platforms. Information may be obtained. The information may include a current location of a vehicle on a ride-sharing platform. A set of paths originated from the current location of the vehicle may be obtained. Each of the set of paths may have a length less than a preset maximum path length. A set of expected cumulative rewards along the set of paths may be obtained based on a trained deep value-network. A best path from the set of paths may be selected based on a heuristic tree search of the set of expected cumulative rewards. A next step along the best path may be recommended as a reposition action for the vehicle.

20 Claims, 7 Drawing Sheets

(56) References Cited

U.S. PATENT DOCUMENTS

| | | | |
|---|---|---|---|
| 10,156,848 B1* | 12/2018 | Konrardy | G01C 21/362 |
| 10,572,798 B2* | 2/2020 | Wang | G06N 3/08 |
| 2005/0071080 A1* | 3/2005 | Sano | G08G 1/096822 |
| | | | 701/428 |
| 2015/0100530 A1* | 4/2015 | Mnih | A63F 13/67 |
| | | | 706/25 |
| 2017/0090480 A1* | 3/2017 | Ho | G05D 1/0027 |
| 2018/0143643 A1* | 5/2018 | Fairfield | G05D 1/0217 |
| 2018/0224866 A1* | 8/2018 | Alonso-Mora | G05D 1/0291 |
| 2018/0348374 A1* | 12/2018 | Laddha | G01S 17/931 |
| 2019/0004527 A1 | 1/2019 | Fairfield et al. | |
| 2019/0102676 A1* | 4/2019 | Nazari | G06N 3/08 |
| 2020/0074354 A1* | 3/2020 | Qin | G06N 5/043 |
| 2020/0189590 A1* | 6/2020 | Luo | G06N 3/088 |
| 2020/0192390 A1* | 6/2020 | Luo | G06N 3/08 |

FOREIGN PATENT DOCUMENTS

| | | |
|---|---|---|
| CN | 110631596 A | 12/2019 |
| CN | 111061277 A | 4/2020 |
| CN | 111197991 A | 5/2020 |

OTHER PUBLICATIONS

Irwan Bello et al., "Neural Combinatorial Optimization with Reinforcement Learning", Workshop Track, ICLR 2017, arXiv:1611.09940v3 [cs.AI] Jan. 12, 2017.

Ian Dewancker et al., "Bayesian Optimization Primer", SIGOPT 2015. https://app.sigopt.com/static/pdf/SigOpt_Bayesian_Optimization_Primer.pdf.

John Holler et al., "Deep Reinforcement Learning for Multi-Driver Vehicle Dispatching and Repositioning Problem", arXiv:1911.11260v1 [cs.LG] Nov. 25, 2019.

Ramon Iglesias et al., "Data-Driven Model Predictive Control of Autonomous Mobility-on-Demand Systems", 2018 IEEE International Conference on Robotics and Automation (ICRA). IEEE, pp. 1-7.

Jiarui Jin et al., "CoRide: Joint Order Dispatching and Fleet Management for Multi-Scale Ride-Hailing Platforms", Proceedings of the 28th ACM International Conference on Information and Knowledge Management. 1983-1992., CIKM '19, Nov. 3-7, 2019, Beijing, China.

Guolin Ke et al., "LightGBM: A Highly Efficient Gradient Boosting Decision Tree", 31st Conference on Neural Information Processing Systems (NIPS 2017), Long Beach, CA. https://papers.nips.cc/paper/6907-lightgbm-a-highly-efficient-gradient-boosting-decision-tree.pdf.

Chiwei Yan et al., "Dynamic Pricing and Matching in Ride-Hailing Platforms", SSRN, 2018.

Minne Li et al., "Efficient Ridesharing Order Dispatching with Mean Field Multi-Agent Reinforcement Learning", arXiv:1901.11454v1 [cs.MA] Jan. 31, 2019, The Web Conference 2019, May 19, San Francisco, CA.

Kaixiang Lin et al., "Efficient Collaborative Multi-Agent Deep Reinforcement Learning for Large-Scale Fleet Management", arXiv:1802.06444v3 [cs.MA] Dec. 2, 2019, pp. 1774-1783. KDD 2018, Aug. 19-23, 2018, London, United Kingdom.

Fei Miao et al., "Taxi Dispatch with Real-Time Sensing Data in Metropolitan Areas—a Receding Horizon Control Approach", IEEE Transactions in Automation Science and Engineering 13, 2 (2016), pp. 463-478.

Justin Miller et al., "Predictive Positioning and Quality of Service Ridesharing for Campus Mobility on Demand Systems", 2017 IEEE International Conference on Robotics and Automation (ICRA). IEEE, pp. 1402-1408.

Mohammadreza Nazari et al., "Reinforcement Learning for Solving the Vehicle Routing Problem", 32nd Conference on Neural Information Processing (NeurIPS 2018), Montreal, Canada.

Takuma Oda et al., "MOVI: A Model-Free Approach to Dynamic Fleet Management", IEEE INFOCOM 2018—IEEE Conference on Computer Communications. IEEE, pp. 2708-2716.

Zhenyu Shou et al., "Where to Find Next Passengers on E-hailing Platforms?—A Markov Decision Process Approach", arXiv:1905.09906v1 [cs.LG] May 23, 2019.

Richard S. Sutton et al., Reinforcement Learning: An Introduction, Second Edition, The MIT Press, 2018.

Richard S. Sutton et al., "Between MDPs and semi-MDPs: A framework for temporal abstraction in reinforcement learning", Artificial Intelligence 112 (1999), pp. 181-211.

Kiaocheng Tang et al., "A Deep Value-network Based Approach for Multi-Driver Order Dispatching", KDD '19, Aug. 4-8, 2019, Anchorage, AK.

Tanvi Verma et al., "Augmenting Decisions of Taxi Drivers through Reinforcement Learning for Improving Revenues", Proceedings of the 27th International Conference on Automated Planning and Scheduling (ICAPS 2017).

Oriol Vinyals et al., "Pointer Networks", Advances in Neural Information Processing Systems, 2015, pp. 2692-2700.

Zhaodong Wang et al., "Deep Reinforcement Learning with Knowledge Transfer for Online Rides Order Dispatching", International Conference on Data Mining. IEEE, 2018.

Zhe Xu et al., "Large-Scale Order Dispatch in On-Demand Ride-Hailing Platforms: A Learning and Planning Approach", Proceedings of the 24th ACM SIGKDD International Conference on Knowledge Discovery & Data Mining. ACM, pp. 905-913. KDD 2018, Aug. 19-23, 2018, London, United Kingdom.

Rick Zhang et al., "Model Predictive Control of Autonomous Mobility-on-Demand Systems", IEEE International Conference on Robotics and Automation (ICRA). IEEE, 2016, pp. 1382-1389.

Lingyu Zhang et al., "A Taxi Order Dispatch Model based on Combinatorial Optimization", Proceedings of the 23rd ACM SIGKDD International Conference on Knowledge Discovery and Data Mining. ACM, pp. 2151-2159. KDD'17, Aug. 13-17, 2017, Halifax, NS, Canada.

Ming Zhou et al., "Multi-Agent Reinforcement Learning for Order-dispatching via Order-Vehicle Distribution Matching", Proceedings of the 28th ACM International Conference on Information and Knowledge Management, 2019, pp. 2645-2653.

Harm van Seijen et al., "A Theoretical and Empirical Analysis of Expected Sarsa", IEEE Symposium on Adaptive Dynamic Programming and Reinforcement Learning, 2009, pp. 177-184. https://doi.org/10.1109/ADPRL.2009.4927542.

PCT International Search Report and the Written Opinion mailed Apr. 9, 2021, issued in related International Application No. PCT/CN2020/101403 (9 pages).

* cited by examiner

VEHICLE REPOSITIONING ON MOBILITY-ON-DEMAND PLATFORMS

TECHNICAL FIELD

The disclosure relates generally to vehicle repositioning on mobility-on-demand platforms using deep reinforcement learning.

BACKGROUND

Mobility-on-demand (MoD) (i.e., ride-hailing) platforms have gained incredible popularity worldwide, thanks to the rising urban population and the consequent need for more availability of on-demand transportation. MoD platforms may connect people with travel needs to drivers with vacant vehicles, greatly tapping into a larger supply pool and reducing the waiting time for getting a ride. A more efficient MoD system may offer a better user experience for both driver and passenger group. Drivers may be able to generate higher income through reduced idle time. Passengers may enjoy shorter waiting times before their trips get fulfilled.

Many existing vehicle repositioning and taxi dispatching systems are under the setting of autonomous MoD, where a fleet of autonomous vehicles are deployed in an MoD system and fully managed by a controller. For convenience, these existing systems may assume that the vehicles will fully follow the repositioning instructions. Most of the existing methods for regular taxi dispatching and routing have this assumption. However, there is additional complexity on regular MoD platforms where vehicles are controlled by human drivers. Idle-time repositioning is typically voluntary. Drivers may not follow the instructions all the time, and the driver may go online and offline at will.

SUMMARY

Various embodiments of the specification include, but are not limited to, systems, methods, and non-transitory computer readable media for vehicle repositioning.

In various implementations, a method may include obtaining information. The obtained information may include a current location of a vehicle on a ride-sharing platform. The method may further include obtaining a set of paths originated from the current location of the vehicle. Each of the set of paths may have a length less than a preset maximum path length. The method may further include obtaining a set of expected cumulative rewards along the set of paths based on a trained deep value-network. The method may further include selecting a best path from the set of paths based on a heuristic tree search of the set of expected cumulative rewards, and recommending a next step along the best path as a reposition action for the vehicle.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining information including a current location of a vehicle on a ride-sharing platform. The operations may further include obtaining a set of paths originated from the current location of the vehicle. Each of the set of paths may have a length less than a preset maximum path length. The operations may further include obtaining a set of expected cumulative rewards along the set of paths based on a trained deep value-network. The operations may further include selecting a best path from the set of paths based on a heuristic tree search of the set of expected cumulative rewards, and recommending a next step along the best path as a reposition action for the vehicle.

Yet another aspect of the present disclosure is directed to a non-transitory computer-readable storage medium configured with instructions executable by one or more processors to cause the one or more processors to perform operations. The operations may include obtaining information including a current location of a vehicle on a ride-sharing platform. The operations may further include obtaining a set of paths originated from the current location of the vehicle. Each of the set of paths may have a length less than a preset maximum path length. The operations may further include obtaining a set of expected cumulative rewards along the set of paths based on a trained deep value-network. The operations may further include selecting a best path from the set of paths based on a heuristic tree search of the set of expected cumulative rewards, and recommending a next step along the best path as a reposition action for the vehicle.

In some embodiments, a grid-world representing a real world geographical area may be obtained. The grid-world may include a plurality of grid cells representing a plurality of order-dispatching regions. The current location of the vehicle may include a first grid cell in the grid-world, and the next step along the best path may include a second grid cell in the grid-world.

In some embodiments, obtaining the set of paths originated from the current location may exclude paths with inaccessible grid cells.

In some embodiments, repositioning may be triggered after the vehicle has been idle for a predetermined number of minutes.

In some embodiments, the obtained information may include a current time step, and the vehicle may be recommended to reposition to a new location corresponding to the next step along the best path at a next time step.

In some embodiments, the trained deep value-network may generate the set of expected cumulative rewards based on a repositioning cost of repositioning to the new location and a future value of the new location.

In some embodiments, the future value of the new location may be based on a dispatch probability and a future cumulative reward from the new location.

In some embodiments, a long search may be triggered if the vehicle has not been dispatched to an order for a threshold amount of time, and the repositioning action may be selected from a long search look-up table.

In some embodiments, the trained deep value-network may be trained within an offline batch reinforcement learning framework.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
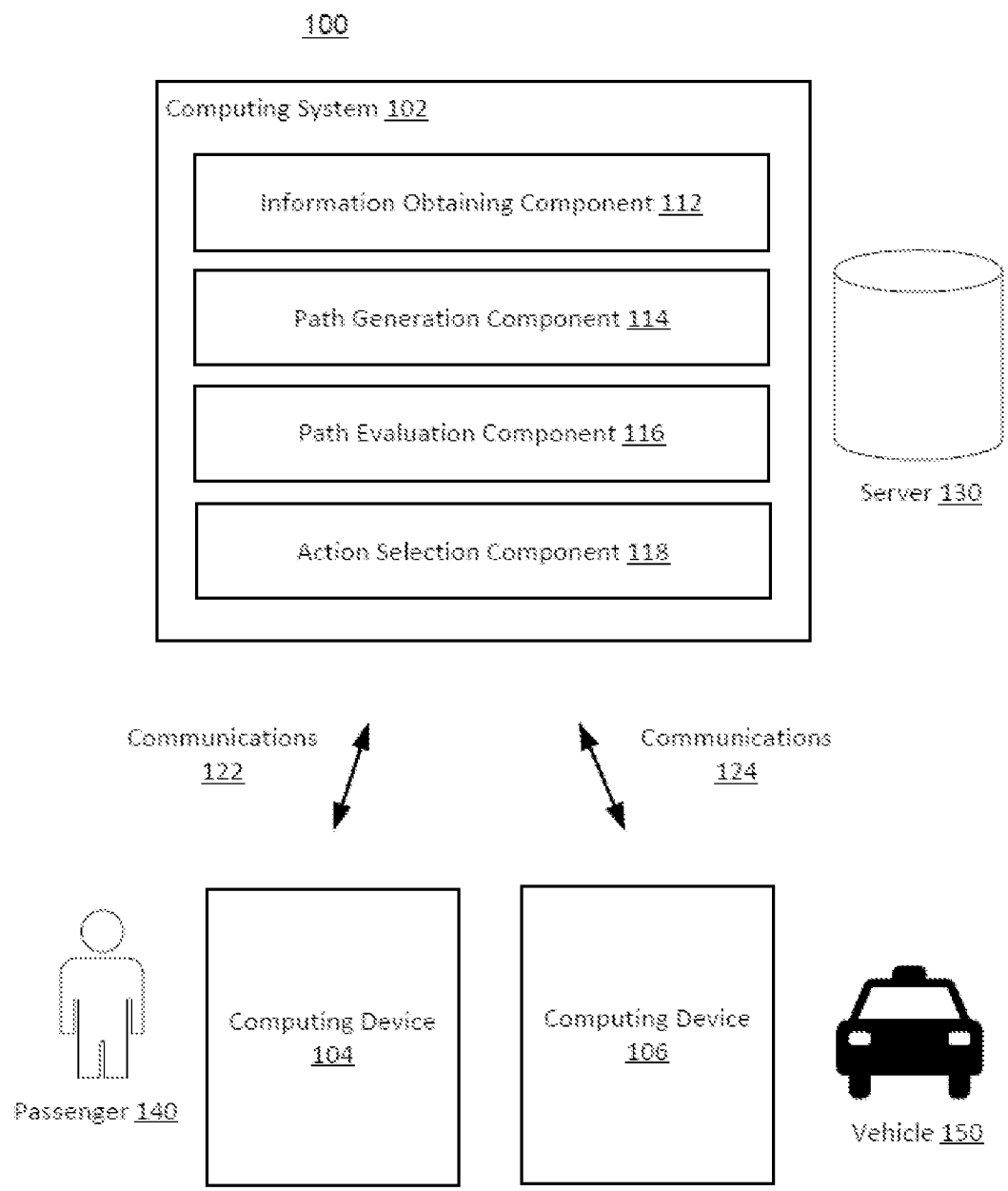
FIG. 1 illustrates an exemplary system to which techniques for vehicle repositioning may be applied, in accordance with various embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein present a new practical framework based on deep reinforcement learning and decision-time planning for real-world vehicle repositioning on ride-hailing (i.e., mobility-on-demand, MoD) platforms. Repositioning may move around idle vehicles with the goal of maximizing the income rate for the drivers. A solution with production deployment in mind may learn the driver-perspective state-value function using a batch training algorithm with a spatiotemporal deep value-network. The optimal repositioning action may be generated on-demand through value-based policy search, which may combine planning and bootstrapping with the value-networks. The algorithm may be benchmarked with baselines in an MoD simulation environment to demonstrate its effectiveness in improving the income rate. A real-world experiment program may be designed and run with regular drivers. The experiment may demonstrate encouraging results on key metrics in comparing the method disclosed in this application against a control group in which the drivers of which performed idle-time repositioning based on their own experience and knowledge.

Model predictive control (MPC) and receding horizon control (RHC) methods for system-level planning and control for autonomous MoD system involve repeatedly solving a mathematical program using predictions of future costs and system dynamics over a moving time horizon to choose the next control action. MPC-based methods may plan out a number of steps into the future and execute one step. MPC-based methods may be grid-based and use discrete time buckets with a short planning horizon due to computational complexity. Deep reinforcement learning and decision-time planning methods may implement a much longer optimization horizon by using state-value functions and may easily fit in a run-time budget.

Reinforcement learning (RL) and deep RL may be used to learn vehicle repositioning and fleet management policies. Environment model parameters may be estimated from data and dynamic programming may be used to learn the state-action value function. Monte Carlo learning may be used to learn the value function from log data for taxi idle-time cruising. With a simulation environment available for training, Deep Q Learning (DQN) may be used for fleet management and the joint problem with order dispatching. Contextual DQN and Advantage Actor Critic (A2C) methods may look at the multi-agent perspective of the fleet management problem. Hierarchical multi-agent RL (MARL) methods may be used for mixed order dispatching and fleet management. The models may be trained in a grid-based simulation environment.

For order matching and dispatching on MoD platforms, dynamic matching may be employed by batching orders and vehicles into discrete time windows, where combinatorial optimization is used to determine the batch assignment. Tabular temporal-difference learning (i.e., TD(0)) may be used to learn a driver-view discrete state-value function for computing edge weights within batch windows. Deep RL in batch mode may be used to train the value function for order dispatching. A specialized network architecture may additionally be used based on hierarchical coarse coding and cerebellar embedding, coupled with a training algorithm robustified by Lipschitz regularization. An architectural extension for transfer learning may also be effective. From a multi-agent perspective of the MoD system, MARL methods based on mean-field theory and KL-divergence optimization may train in a grid-based simulation environment. Vehicle repositioning and fleet management are related to classical vehicle routing problems, where machine learning methods with deep neural networks may be used as new approaches to the traveling salesman problem (TSP) and the Vehicle Routing Problem (VRP), under an encoding-decoding framework.

The efficiency of an MoD system may depend on how well the supply and demand distributions are aligned in both spatial and temporal spaces. There may be two primary levers for optimizing the operational efficiency of an MoD platform through regulating the supply distribution to better align with the demand: vehicle repositioning and order dispatching (i.e., matching). Vehicle repositioning is a proactive measure, by deploying idle vehicles to a specific location in anticipation of future demand at the destination or beyond. Order dispatching matches idle drivers (i.e., vehicles) to open trip orders. From the view of spatiotemporal movement, order dispatching may be thought of as a special case of vehicle repositioning through servicing trip orders. It may not be an entirely proactive action because demand (i.e., trip orders) may be exogenous.

There are two types of algorithms for repositioning based on the different perspectives. A driver-perspective algorithm may optimize the metrics (e.g. income per hour, idle time) for individual drivers, while a system-perspective algorithm may optimize global metrics (e.g. total gross merchandise value (GMV), total idle time). An MoD system is naturally a multi-agent system, with the drivers being the agents. One of the main challenge in using independent learning methods (e.g. driver-perspective algorithm) to solve multiagent systems is the non-stationarity of the environment observed by each individual agent as its action would affect the actions of the other agents. Nevertheless, independent learning methods may still be able to achieve good performance in vehicle repositioning or fleet management. Moreover, there are scenarios where the stationarity assumption of the environment does hold. In the case of an MoD platform, when the number of drivers (i.e., vehicles) to execute the learned repositioning policy is small relative to the entire population, each agent may be thought of as acting independently, since its actions are unlikely to affect the environment (i.e. the overall demand-supply condition). Such scenarios may have good business use cases. For example, an intelligent driver assistant may be used for those who are new to an MoD platform to help them quickly ramp up by providing learning-based idle-time cruising strategies.

The problem of vehicle repositioning may be considered from a single driver's perspective, leaving order dispatching to the environment. The objective may be to learn an optimal policy that maximizes an individual driver's daily income rate, measured by income-per-hour (IPH) or equivalently, GMV-per-hour (GPH), assuming that a constant fraction of GMV is allocated for income. In other words, it may be demonstrated that machine learning and AI are able to equip an average driver with the decision-making capability of an experienced driver in the ride-hailing or taxi domain. The problem may be modeled within a semi-Markov decision process (semi-MDP) framework, which optimizes a long-term cumulative reward (e.g., daily income rate) and models the impact of temporally extended actions (i.e., repositioning movements) on the long-term objective through state transitions along a policy. The state value function may be learned using a specially designed spatiotemporal deep value network trained within an offline batch RL framework. The state-value function and knowledge about the environment dynamics may then be used to develop a value-based policy search algorithm for real-time vehicle repositioning. The value-based search algorithm may be a type of heuristic search algorithm for decision-time planning and may be plugged into a generalized policy iteration framework for continuous improvement.

A practical framework may be used for vehicle repositioning based on deep value network and heuristic search for decision-time planning. The method does not require complete vehicle repositioning trajectory data and is sufficiently adaptive for production deployment and real-time execution. The proposed solution may be implemented in a production environment on a ride-sharing platform (e.g., DiDi) with regular drivers. A real-world experiment program may be developed with carefully designed incentive and operational schemes that allow successful testing of the repositioning algorithm. Empirical results and practical experience are reported from this real-world deployment of an RL-based vehicle repositioning algorithm on an MoD platform.

Several factors should be considered in designing a solution framework for the vehicle repositioning problem. First, the algorithm should be practical for implementation on real-world production system and for real-time execution. This prevents making some significant simplification assumptions. In particular, grid-based algorithms and those that require end-to-end training in a simulation environment may be hard to deploy. Second, the objective should be to maximize an agent's daily income rate, which is long-term reward optimization on the scale of trips. Model Predictive Control (MPC) with long horizon is expensive to solve. A coarse discretization for the time would render the solution hard to implement and execute. On the other hand, RL, which focuses on long-term values, may be well-suited for such objectives. Third, data from regular MoD systems is usually incomplete regarding idle-time repositioning. As a result, it may be hard to learn a state-action value function for repositioning directly from data. However, it may be relatively straightforward to learn the state value function. Fourth, at real-world decision time, flexibility is often required in the algorithm in terms of the types of actions to take, such as going beyond the action set. Finally, the run time requirement for responding to a repositioning request may be moderate, since the driver is not blocked from operations while the algorithm is searching for a repositioning action.

A solution framework may be developed which combines offline batch RL and decision-time planning for guiding vehicle repositioning. A simulation environment may not be required for training and the framework may work on incomplete trajectory data. The value function may have an optimization horizon covering an entire day, and the framework may be flexible enough to support policy variations for non-regular scenarios. Efficient implementation based on tree search may allow the framework to fit in the run-time budget of the application while performing planning and computing the optimal action at decision-time.

The environment dynamics may be described as follows. The driver, when idle, may be assigned to a nearby trip order by the MoD platform. Order dispatching (i.e., matching) may take place in a batch fashion typically with a time window of a few seconds (e.g., 15, 20, 21). The driver may go to the origin of the trip (i.e. where the passenger is located) and transport the passenger to the destination. A trip fee may be collected upon the completion of the trip. The passenger may cancel the order if the waiting time before a driver is matched is too long or the pick-up time for the matched driver is too long. After dropping off the passenger, the driver may become idle. If the idle time exceeds a threshold of L minutes, the driver may perform repositioning by cruising to a specific destination, incurring a non-positive cost. If the driver is to stay around the current location, he/she may stay for L minutes before another repositioning may be triggered. During the course of any repositioning, the driver may still be eligible for order assignment.

This process may be modeled by a semi-MDP with the agent being the driver. The driver's state may be denoted as s. Basic state features may include spatiotemporal information, (i.e. location l and time t) so that s=(l, t). s may include additional supply-demand contextual features. The eligible actions for the agent may include both order fulfillment (e.g., as a result of order dispatching) and vehicle repositioning. These actions may be temporally extended to be options in the context of a semi-MDP and may be denoted by o. A basic repositioning task may include going towards a destination in one of the regions neighboring the region that the driver is currently in. Longer repositioning may be possible under special circumstances. The time duration of a repositioning or order fulfillment option may be $\tau_o$. The price of the trip corresponding to an option may be $p_o > 0$, of which a fixed portion may be assumed to be allocated as the driver's income. The cost of a repositioning option may be $c_o \leq 0$. The immediate reward of a transition may be $r = c_o$ for repositioning and $r = p_o$ for order fulfillment. The corresponding estimated version of $\tau_o$, $p_o$, and $c_o$ may be denoted as $\hat{\tau}_o$, $\hat{p}_o$, and $\hat{c}_o$, respectively.

The repositioning policy and the order dispatching policy may be denoted separately by $\pi_r$ and $\pi_d$, and the joint policy $\pi := (\pi_r, \pi_d)$. Learning the repositioning policy $\pi_r$ may be focused on and it may be assumed that $\pi_d$ is exogenous and fixed. $\pi_d$ may not be explicitly learned, however a state-value function associated with both current policies $\pi_{r0}$ and $\pi_{d0}$ (i.e. $\pi_0$) may be learned from the trip data. In some embodiments, at any decision point for the algorithm, only the repositioning options need to be considered. Order dispatching may be executed automatically following a given dispatching policy $\pi_0$. The state-option value function may be denoted by $Q^{\pi_r}(s, o)$, and may also be associated with $\pi_{d0}$. $\hat{Q}$ may denote the approximation of the Q-function. A model-based method may be used to compute $\hat{Q}(s, o)$ for a particular s so that the repositioning agent may be able to select the best movement at each decision point. The objective may be to maximize the daily cumulative income rate (or GPH) of a driver, which may be the ratio of the total price of the trips completed during a day and the total online hours logged by the driver.

FIG. 1 illustrates an exemplary system 100 to which techniques for vehicle repositioning may be applied, in accordance with various embodiments. The example system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, etc. The computing devices 104 and 106 may each be associated with one or more vehicles (e.g., car, truck, boat, train, autonomous vehicle, electric scooter, electric bike, etc.). The computing devices 104 and 106 may each be implemented as an in-vehicle computer or as a mobile phone used in association with the one or more vehicles. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ridesharing platform. The ridesharing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ridesharing platform.

The computing system 102 may receive the request and reply with price quote data and price discount data for one or more trips. The price quote data and price discount data for one or more trips may be included in communications 122. When the passenger 140 selects a trip, the computing system 102 may relay trip information to various drivers of idle vehicles. The trip information may be included in communications 124. For example, the request may be posted to computing device 106 carried by the driver of vehicle 150, as well as other commuting devices carried by other drivers. The driver of vehicle 150 may accept the posted transportation request. The acceptance may be sent to computing system 102 and may be included in communications 124. The computing system 102 may send match data to the passenger 140 through computing device 104. The match data may be included in communications 122. The match data may also be sent to the driver of vehicle 150 through computing device 106 and may be included in communications 124. The match data may include pick-up location information, fees, passenger information, driver information, and vehicle information. The matched vehicle may then be dispatched to the requesting passenger. The fees may include transportation fees and may be transacted among the system 102, the computing device 104, and the computing device 106. The fees may be included in communications 122 and 124. The communications 122 and 124 may additionally include observations of the status of the ridesharing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include an information obtaining component 112, a path generation component 114, a path evaluation component 116, and an action selection component 118. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

The information obtaining component 112 may be configured to obtain information. The obtained information may include a current location of a vehicle on a ride-sharing platform. Obtaining information may include one or more of accessing, acquiring, analyzing, determining, examining, identifying, loading, locating, opening, receiving, retrieving, reviewing, storing, or otherwise obtaining the information. In some embodiments, the obtained information may include a current time step. In some embodiments, a grid-world representing a real world geographical area may be obtained. The grid-world may include a plurality of grid cells representing a plurality of order-dispatching regions. The current location of the vehicle may include a first grid cell in the grid-world. For example, a city may be divided into regional dispatch areas. The grid-world may be used to represent the real world and divide the real world into several order-dispatching regions.

The path generation component 114 may be configured to obtaining a set of paths originated from the current location of the vehicle. Each of the set of paths may have a length less than a preset maximum path length. In some embodiments, the set of paths originated from the current location of the vehicle may be obtained from a dispatch environment model. The dispatch environment model may be constructed by learning a conditional value network along with the corresponding probability estimation.

In some embodiments, repositioning may be triggered after the vehicle has been idle for a predetermined number of minutes (e.g., when the driver has been idle for L minutes). After the deep value network has been learned within the training framework, an optimal action may be selected using decision-time planning when repositioning is triggered. The decision-time planning may be interpreted through path value approximation. When repositioning to a further destination, the route is important in addition to the destination cell. The driver may be matched to orders along the way, generating income. The search algorithm's goal may include finding a path to the destination that has the highest expected value among all the alternative paths. The expected value of n-step look-ahead repositioning paths from the current spatiotemporal state may be computed. The optimal path may then be selected, and the first step of the selected path may be executed.

Figure 2:
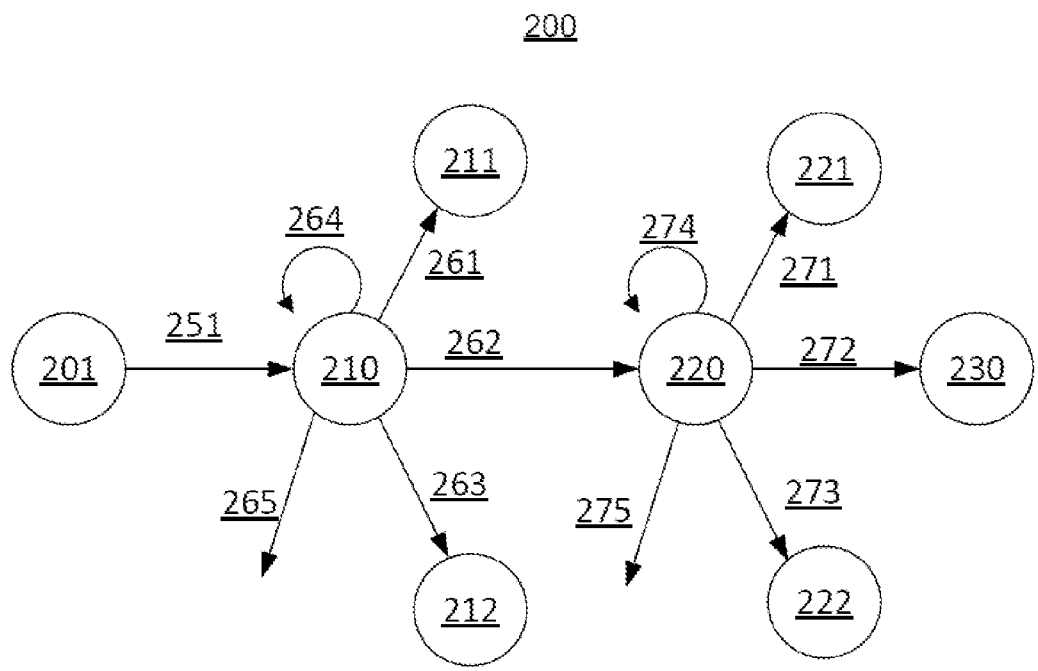
FIG. 2 illustrates an exemplary environment model, in accordance with various embodiments.

FIG. 2 illustrates an exemplary environment model 200, in accordance with various embodiments. The environment model 200 may include nodes 201, 210-212, 220-222, and 230. For example, nodes may correspond to a grid cell in a grid world. A vehicle may arrive at node 210 via transition 251 from initial node 201. For example, the vehicle may arrive at node 210 when a driver first comes online, after a passenger is dropped off, or after a repositioning operation. At node 210, a vehicle may perform the following actions: reposition 261 to node 211, reposition 262 to node 220, reposition 263 to node 212, stay 264 at node 210, or dispatch 265 to a ride order. At node 220, a vehicle may perform the following actions: reposition 271 to node 221, reposition 272 to node 230, reposition 273 to node 222, stay 274 at node 220, or dispatch 275 to a ride order. Order dispatching happening during 'reposition' actions may be assumed to take place at the next node.

In some embodiments, the dispatch environment model may be used to carry out planning of potentially multiple steps from the particular state $s_0$, the state of the agent when repositioning is triggered. This may allow the state-option pairs associated with $s_0$ and all the available repositioning options at that state to be evaluated at run-time and the best move to be selected for the next step. The next time repositioning is triggered, the same planning process may be repeated. The dispatch environment model may be described as follows. At state s, the probability of the driver being dispatched may be $p_d^{(s)}$, and the probability of being idle within the time interval of L minutes may be $p_{id}^{(s)}=1-p_d^{(s)}$. The estimated time of arrival (ETA) for transitioning from the current state $s_0$ to the target state $s_i$ may be $t_{0i}:=\Delta t(s_0, s_i)$. Transitions for both vehicle repositioning and order fulfillment may be deterministic.

In some embodiments, each city area may be divided into hex grid cells, with each cell covering an equal size area. In each grid cell, a suggested (by an independent service) pick-up point may be used as the potential repositioning destination. Depending on the city, some cells might be "inaccessible" (e.g. lakes, rivers, mountains) or might be missing well-known pick-up points (e.g. low population density areas). In some embodiments, obtaining the set of paths originated from the current location may exclude paths with inaccessible grid cells. The maximum path length may be used as the main parameter considered for the path generation. This parameter may be called the search depth. It may be set separately for each city so as to optimize simulation results. A breadth-first strategy may then be used to generate paths no longer than the search depth. Because of inaccessible cells, it may happen that no generated path reaches the search depth. In the infrequent case where no cell is accessible within the search depth distance to the origin cell, the breadth-first search may be expanded to city limits to find the closest accessible cells to the origin and those may be proposed as reposition candidates.

Returning to FIG. 1, the path evaluation component 116 may be configured to obtain a set of expected cumulative rewards along the set of paths based on a trained deep value-network. In some embodiments, the trained deep value-network may be trained using a specially designed spatiotemporal deep value network training within an offline batch RL framework. In some embodiments, The trained deep value-network may include a state value function. The state value function may be decomposed into four components by conditioning on whether the driver is being dispatched or not, e.g., $$V(s)=p_d V(s|\text{dispatch})+p_{id} V(s|\text{idle}). \quad (1)$$

where $p_d$ is the probability of the driver being dispatched at state s with $p_{id}=1-p_d$ being the probability of being idle, while $V(s|\text{dispatch})$ and $V(s|\text{idle})$ are the corresponding long-term value function conditioned on whether the associated driver is being dispatched or not at state s. The training framework for a dispatching value function may be adapted to the learning of the four model components $V(s|\text{dispatch})$, $V(s|\text{idle})$, $p_d$ and $p_{id}$.

Variance may be reduced via a dual policy evaluation. A binary option o may be defined with 0 indicating idle and 1 as dispatched. $V(s|\text{dispatch})$ and $V(s|\text{idle})$ may then be represented as $V(s|o=1)$ and $V(s|o=0)$, respectively. $V(s|o)$ may be the state-option value function $Q(s, o)$. Evaluation of $V(s|o)$ under a behavior policy may be done using a standard Temporal Difference (TD) algorithm (e.g., State-action-reward-state-action ( ). TD-learning (e.g., SARSA) may be prone to large variance during training. Reducing variance may be particularly critical for learning a robust dispatching policy under the temporally extended semi-MDP framework.

Dual Policy Evaluation (DPE) may prevent stochasticity in the policy from further increasing variance. It may do so by jointly learning V (s|o) and V (s) while basing the update of V (s|o), not on V (s|o'), but on its expected value V (s). The update equations are presented below in (2) and (3). In essence this is similar to expected SARSA. The main difference is that expected SARSA may use empirical samples to approximate the expected value while DPE may do so by directly learning a separate function approximator. The overhead of learning two policies may be minimum in this case since both V(s|o) and V(s) are required for the value-based policy search. Now, consider the k-step transition from $s_0$ to $s_k$ by applying the option o. The k-step bellman equation may be written as follows:

$$V(s_0 \mid o) \leftarrow \frac{R_o(\gamma^k - 1)}{k(\gamma - 1)} + \gamma^k V(s_k), \quad (2)$$

$$V(s_0) \leftarrow \frac{R_o(\gamma^k - 1)}{k(\gamma - 1)} + \gamma^k V(s_k). \quad (3)$$

where γ is the discount factor between 0 and 1 and k≥1 is the transition steps. Ro is the reward from the option which is either 0 or the trip fee depending on whether the option is idle or dispatch. Time discounting may be applied to the reward Ro based on the semi-MDP framework. A neural network may be used to represent the value function. Both the conditional value network V (s|o) and the marginalized one V (s) may be maintained and updated for training. A state representation may be employed and the model may be trained. For the conditional network, a separate embedding matrix may be engaged to encode the binary option and use the multiplicative form to force interactions between the state features and the option embedding. Both V (s|o) and V (s) may share the same state representation but may have a separate branch for the output.

The dispatching probability $p_d := p(o=1|s)$ may be estimated by maximizing its log-likelihood on the marketplace transaction data. To generate the training data, drivers' historical trajectories may be collected including the descriptions of completed trips as well as the online and offline states. The states when the driver receives the trip request may be used as the positive examples indicating the option being 1. For the negative examples, all possibilities are unable to be enumerated considering the limited observed trajectories and the system complexity. As a result, negative samplings may be performed. The negative examples may be used for training are drivers' starting states of idle transaction in-between orders as well as the states when they become active or inactive. The training may be done using one-month driver trajectories. Experiments on hold-out datasets show that the learned estimator may achieve an area under the curve (AUC) of 0.867±0.010 across multiple days and cities. Detailed results are presented in Table 1.

TABLE 1

Evaluation results of the dispatch probability models.

| City | Recall | Precision | F1 | Accuracy | AUC |
|---|---|---|---|---|---|
| A | 0.7782 | 0.7596 | 0.7835 | 0.8014 | 0.876 |
| B | 0.7568 | 0.7592 | 0.7618 | 0.7761 | 0.853 |
| C | 0.7745 | 0.7834 | 0.7812 | 0.7977 | 0.8729 |

In some embodiments, the trained deep value-network may generate the set of expected cumulative rewards based on a repositioning cost of repositioning to the new location and a future value of the new location. In some embodiments, the future value of the new location may be based on a dispatch probability and a future cumulative reward from the new location. In some embodiments, the expected cumulative reward $Q^*(s_0, o)$ associated with the optimal policy $\tau^*_r$ given the current driver state and repositioning option may be estimated so that arg $\max_o \hat{Q}^*(s_0, o)$ gives the approximate optimal repositioning o* at decision-time. The one-step expansion per the environment model may be written as:

$$Q^*(s_0, o) = r^{(0,1)} + (V^*)^{(t_0,1)}(s_1) \quad (4)$$

where $r^{(0,1)} \leq 0$ is the repositioning cost from $s_0$ to $s_1$, and $s_1$ is the state after repositioning o, with location $l_1$ and time $t_0+t_{01}$. $V^*$ is the state-value function associated with the optimal policy $\tau^*_r$. To make the time component of the input explicit, $(V^*)^{(t_0,1)}$ may be the same value function with time component $t_{01}$ ahead of the decision-time $t_0$. All value functions with a future time component are assumed properly discounted without clogging the notation. The discount factor $\gamma^{(t-t_0)}$ may be used, where t is discretized time component for the input state, and $t_0$ is the time for current decision point. The duration that incurs cost r may be $\Delta t$, and the starting time for the cost may be t. The cost may be assumed to be properly discounted:

$$r \leftarrow \frac{\gamma^{(t-t_0)} r(\gamma^{(\Delta t)} - 1)}{\Delta t(\gamma - 1)} \quad (5)$$

The trained state-value function V may be used to replace $V^*$, and $V^{(t_{01})}$ may be concisely rewritten as $V_1^{(t_{01})}$, then $$\hat{Q}^*(s_0, o) = r^{(0,1)} + V_1^{(t_0,1)} \quad (6)$$

The one-step expansion may render a greedy policy, by selecting the repositioning movement leading to the next-state with highest value given by the V-Net, V. $\hat{Q}^*(s_0, o)$ may be represented as $Q^{\pi_0}(s_0, o)$ in this case since V is computed by policy evaluation on historical data generated by $\pi_0$. Hence, finding the optimal option to execute by o*=arg $\max_o \hat{Q}^*(s_0, o)$ may be a one-step policy improvement in generalized policy iterations.

The environment model may be used to expand $\hat{Q}^*$ further:

$$\hat{Q}^*(s_0, o) = r^{(0,1)} + p_{id}^{(1)} \hat{V}(s_1|dispatch) + p_{id}^{(1)} \hat{V}^*(s_1|idle) \quad (7)$$

wherein $p_d^{(1)}$ is the dispatch probability at $s_1$. $\hat{V}^*(s_1|dispatch)$ may be replaced by the conditional V-Net, $\hat{V}^{(0,1)}$. When the driver is idle, the immediate next option has to be a reposition, and $\hat{V}^*(s_1|idle) = \max_j \hat{Q}^*(s_1, o_j)$, where $o_j$ is the second-step reposition option. $\hat{Q}^*(s_0, o)$ may be recursively expanded based on the number of steps looking into the future, eventually written in terms of the given estimated state-value function.

A two-step expansion may be written as:

$$\hat{Q}^*(s_0, o) = r^{(0,1)} + p^{(1)} \tilde{V}^{(t_0,1)} + p_{id}^{(1)} \max_j \hat{Q}^*(s_1, o_j) \quad (8)$$

$$= r^{(0,1)} + p_d^{(1)} \tilde{V}^{(t_0,1)} + \max\left\{\max_{j \neq 1} r^{(1,j)} + V_j^{(t_{0j})}, V_1^{(t_{01}+L)}\right\} \quad (9)$$

The three-step expansion may be written as:

$$\hat{Q}^*(s_1, o_j) = r^{(1,j)} + p_d^{(j)} \tilde{V}_j^{(t_{0j})} + p_{id}^{(j)} \max\left\{\max_{k \neq j} r^{(j,k)} + V_k^{(t_{0k})}, V_1^{(t_{0j}+L)}\right\} \quad (10)$$

In the above equations, $t_{0j} := t_{01} + t_{1j}$, $t_{0k} := t_{01} + t_{1j} + t_{jk}$, may represent the total ETA of two-step and three-step repositions respectively.

In some embodiments, the search algorithm may aim to find the path which has the maximum expected reward. The algorithm directly derived from the equation 10 above may not be efficient, because it does not allow batching requests to the V-net model. To solve this issue, the equation may be rewritten as follows. For the case of staying at the same location (j=k), the conventions $r^{(j,k)}=0$ and $t_{0k}=t_{0j+1}$ may be used. This allows:

$$\max\left\{\max_{k \neq j}\left\{r^{(j,k)} + V_k^{(t_{0k})}\right\}, V_1^{(t_{0j}+L)}\right\} = \max_k\left\{r^{(j,k)} + V_k^{(t_{0k})}\right\} \quad (11)$$

The results in the three-step expansion may be simplified to get:

$$\hat{Q}(s, o) = r^{(0,1)} + p_d^{(1)} \hat{V}(s_1) + p_{id}^{(1)} \left( \max_j \hat{Q}(s_1, o_j) \right) \qquad (12)$$

$$= r^{(0,1)} + p_d^{(1)} \hat{V}(s_1) + p_{id}^{(1)} \max_j \left\{ r^{(1,j)} + p_d^{(j)} \hat{V}(s_j) + p_{id}^{(j)} \max_k \left\{ r^{(j,k)} + V_k^{(t_{0k})} \right\} \right\} \qquad (13)$$

$$= r^{(0,1)} + p_d^{(1)} \hat{V}(s_1) + p_d^{(1)} \max_{j,k} \left\{ r^{(1,j)} + p_d^{(j)} \hat{V}(s_j) + p_{id}^{(j)} \left( r^{(j,k)} + V_k^{(t_{0k})} \right) \right\} \qquad (14)$$

$$= \max_{j,k} \left\{ r^{(0,1)} + p_d^{(1)} \hat{V}(s_1) + p_{id}^{(1)} \left( r^{(1,j)} + p_d^{(j)} \hat{V}(s_j) + p_{id}^{(j)} \left( r^{(j,k)} + V_k^{(t_{0k})} \right) \right) \right\} \qquad (15)$$

Equation 15 may be used to determine the cumulative reward. Determining the cumulative reward may be split into two phases. First, all the paths of a certain length originating at the starting grid cell may be generated using breadth first search. Second, the value of each path may be calculated, and the first step of the path which has the maximum value may be selected as the reposition action. The main benefit of splitting the algorithm like this is to allow batching requests of to the vnet model in the second phase.

The action selection component 118 may be configured to select a best path from the set of paths based on a heuristic tree search of the set of expected cumulative rewards. In some embodiments, once a set of paths has been generated, the longest ones may be selected for evaluation. Depending on the length, a different formula may be applied to each path in order to calculate its value. For example, equation 15 may be applied if the paths up for evaluation are of length 3. If only length 1 paths are present, equation 7 may be used.

The action selection component 118 may further be configured to recommend a next step along the best path as a reposition action for the vehicle. For example, the first step of the path which has the maximum value may be returned as a reposition action. In some embodiments, the next step along the best path may include a second grid cell in the grid-world. In some embodiments, the vehicle may be recommended to reposition to a new location corresponding to the next step along the best path at a next time step.

In some embodiments, a long search may be triggered if the vehicle has not been dispatched to an order for a threshold amount of time, and the repositioning action may be selected from a long search look-up table. In some cases (e.g. driver being stuck in the rural area), it can take the search algorithm many reposition actions to get a driver to a higher value place. In order to avoid having drivers spend too much time at a low value area despite repositioning actions (e.g., threshold set to 100 minutes without being dispatched an order), the algorithm may have a special provision called "long search." The goal of long search may be to reposition drivers to a globally relevant area in order to speed up reposition process in a low-value area. Long search may be decided based on a look-up table containing the V value for each grid cell for each 20 minute time window. At run time, the cell among the top ten highest value locations which is closest to the driver may be chosen as the repositioning destination.

Empirical results and observations may be obtained from simulation and real-world experiments. Two types of simulation environments may be used for evaluating vehicle repositioning policies on order dispatching for MoD platforms. It should be emphasized that the proposed algorithms do not require these environments during training. For more realistic modeling of the real-world MoD system, multi-driver simulators may be augmented with individual vehicle repositioning capability. In this environment, a given number of vehicles (e.g., 3) may be specified to follow the learned repositioning policy $\pi_r$. The given order dispatching policy $\pi_d$ may be supplied to the environment and may assign trip orders to the drivers in batch windows. In addition, order dispatching may interrupt a repositioning action.

Deploying a vehicle repositioning algorithm real-world MoD platform with human drivers may require additional consideration of the way the repositioning recommendations are delivered to the drivers and the drivers' willingness to accept and follow the recommendations, because the drivers within the experiment program were on a voluntary basis in terms of executing the repositioning tasks, due to various practical constraints.

Repositioning recommendations may be delivered through pop-up message cards within the mobile driver app. Once repositioning is triggered, a message card may appear at the target driver's app. The message card may contain instructions for the repositioning task, including the destination and the target time that the driver is required to be there. After the driver acknowledges the task, GPS navigation may be launched to provide turn-by-turn route guidance to the driver. The system may automatically determine if the driver has reached the prescribed destination within the required time frame.

Since the goal of the experiment is to benchmark algorithms on long-term cumulative metrics (daily income rate) and the supply-demand context could vary significantly within a day, it would be ideal if the all drivers in the program are online for the same period time which is also sufficiently long, and the drivers always follow the repositioning recommendations, for a fair comparison. An incentive scheme may be used to encourage the drivers to participate as closely to the ideal situation as possible. Specifically, drivers may be required to be online for at least five hours out of the eight hours from 11 am to 7 pm (the experiment interval) during weekdays and skip or fail to complete no more than three tasks each day. The drivers may be rewarded for each repositioning task that they finished, and may receive additional reward for each day that they met the daily requirements and the week that they met daily requirements for all weekdays.

The experiment program may be evaluated from several different perspectives. First, the income rates across the three cities may be observed. The advantage of algorithmic repositioning may appear most significant for the group of regular drivers without preferential order matching. Regular drivers without preferential order matching may be more likely to be in need of idle-time cruising guidance, thus offering larger room for improvement through algorithmic repositioning.

Figure 3:
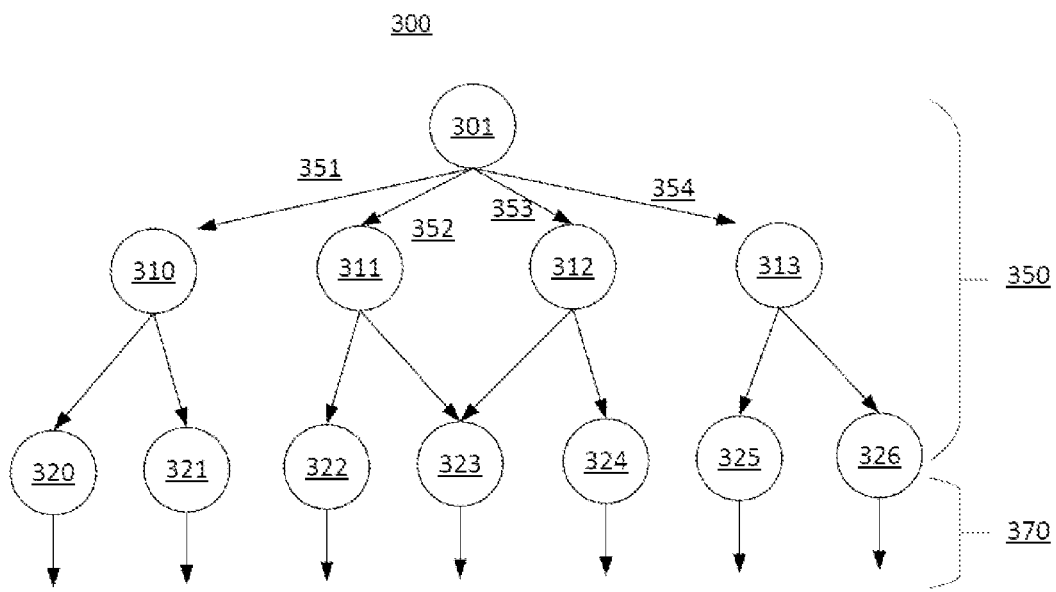
FIG. 3 illustrates an exemplary value-based policy search, in accordance with various embodiments.

FIG. 3 illustrates an exemplary value-based policy search 300, in accordance with various embodiments. A large tree of possible future states may be grown for the current state at root node 301 at decision-time. The estimated state-value function may be applied to the leaf nodes 320-326, and the values may then be backed up toward the current state at the root node 301 to allow a greedy selection of an action. This type of decision-time planning method is known as a heuristic search. The value-based policy search 300 may include a model portion 350 and a bootstrapping portion 370. Bootstrapping may be used at leaf nodes 320-326 through the given state-value function V. The values at the bottom level leaf nodes 320-326 may be compared and the max (corresponding to $\hat{V}^*(s_1|idle)$) may be combined with the $\hat{V}$ node (corresponding to $\hat{V}^*(s_1|dispatch)$) through dispatch probabilities to determine $\hat{Q}^*$. The expected cumulative reward $\hat{Q}(s, o)$ of taking actions 351-354 to next nodes 310-313 may be determined at root node 301. An n-step look-ahead path may also correspond to a path from the root to a leaf node with a depth of 2n.

Figure 4:
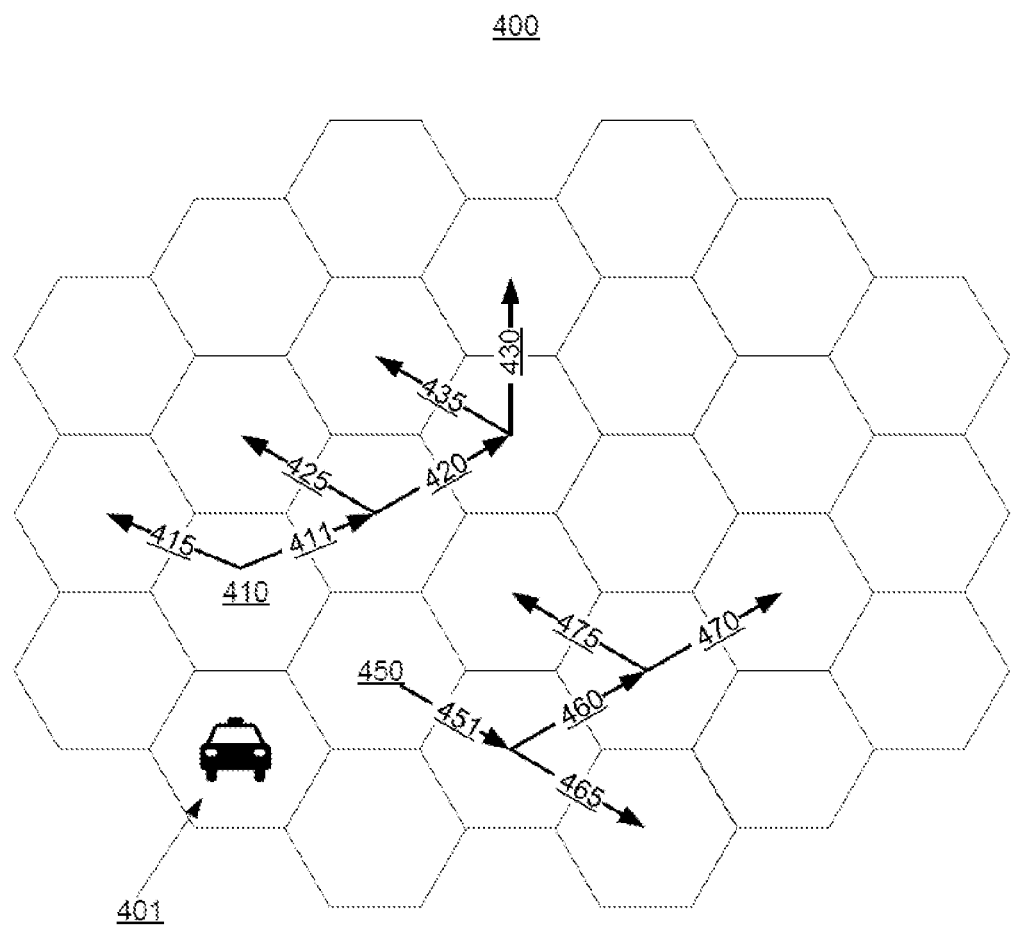
FIG. 4 illustrates an exemplary path value graph, in accordance with various embodiments.

FIG. 4 illustrates an exemplary path value graph 400, in accordance with various embodiments. Grid cell 401 may be the current position of a vehicle. Grid cells 410 and 450 may be the destinations of two different first-step repositions. Repositions 411, 420, 451, and 460 may be within the look-ahead horizon. Repositions 430 and 470 may be further movements whose values are covered by bootstrapping. Potential orders 415, 425, 435, 465, and 475 may originate with the grid cells along the repositioning paths. Selecting the max-value path may be equivalent to $o^* = \arg\max_o \hat{Q}^*(s_0, o)$ in terms of the action executed. The heuristic search method may not explicitly save $\hat{Q}^*$ computed at each decision point. The new data generated by the current learned policy may be collected over time and may be used to update the state-value function, which in turn may update the policy through decision-time planning.

Figure 5:
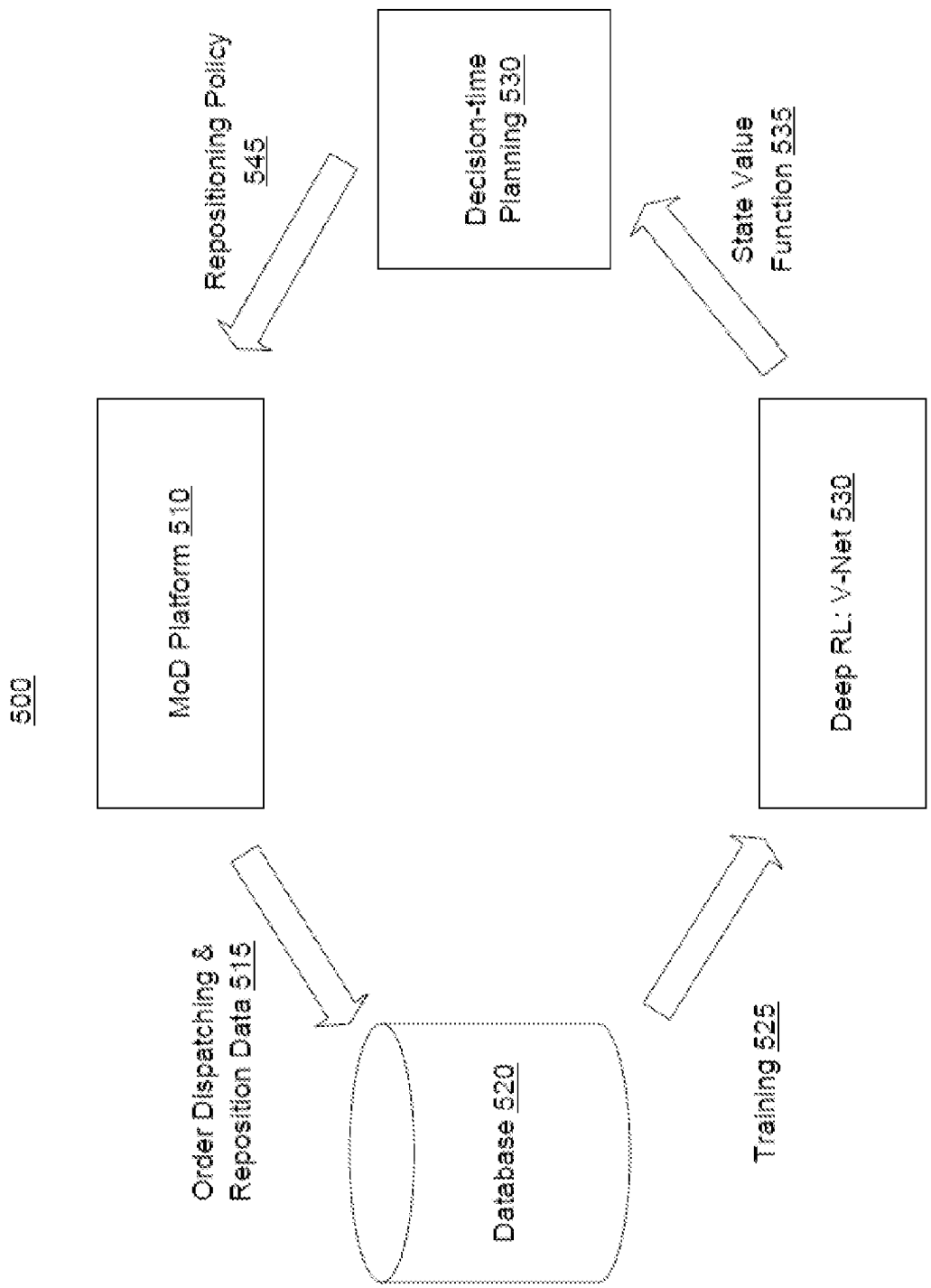
FIG. 5 illustrates an exemplary policy iteration framework for vehicle repositioning, in accordance with various embodiments.

FIG. 5 illustrates an exemplary policy iteration framework 500 for vehicle repositioning, in accordance with various embodiments. The repositioning policy may be updated based through feedback. Order dispatching and reposition data 515 from MoD platform 510 may be stored in database 520. Data from database 520 may be used in training 515 the deep RL: V-Net 530. The Deep RL: V-Net 530 may provide state value function 535 (e.g., V, $\hat{V}$) for use in decision-time planning 530. Decision-time planning 530 may provide reposition policy 545 (i.e., $\pi_r$) to MoD platform 510.

Figure 6:
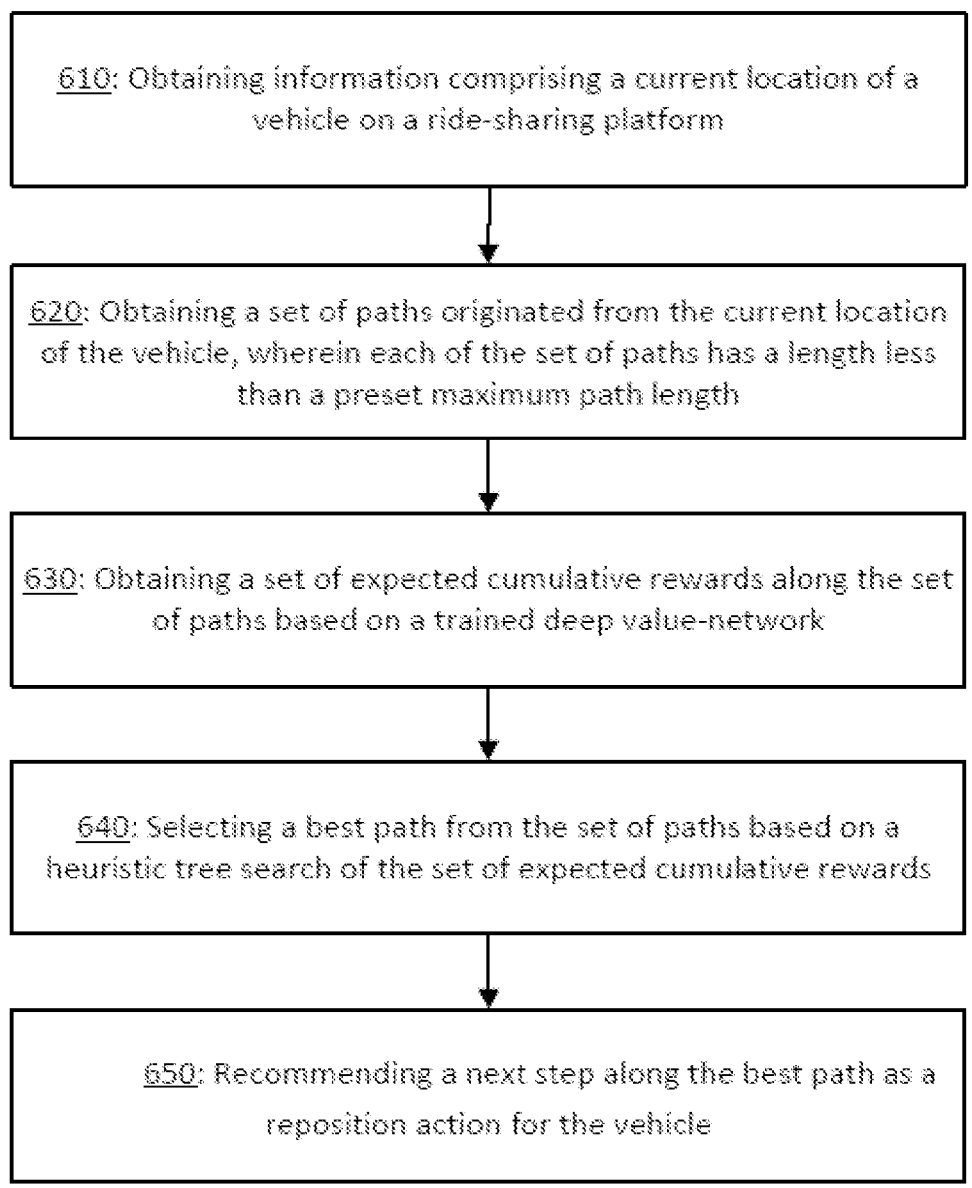
FIG. 6 illustrates a flowchart of an exemplary method, according to various embodiments of the present disclosure.

FIG. 6 illustrates a flowchart of an exemplary method 600, according to various embodiments of the present disclosure. The method 600 may be implemented in various environments including, for example, the system 100 of FIG. 1. The method 600 may be performed by computing system 102. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, information may be obtained. The information may include a current location of a vehicle on a ride-sharing platform. At block 620, a set of paths originated from the current location of the vehicle may be obtained. Each of the set of paths may have a length less than a preset maximum path length. At block 630, a set of expected cumulative rewards along the set of paths may be obtained based on a trained deep value-network. At block 640, a best path from the set of paths may be selected based on a heuristic tree search of the set of expected cumulative rewards. At block 650, a next step along the best path may be recommended as a reposition action for the vehicle.

Figure 7:
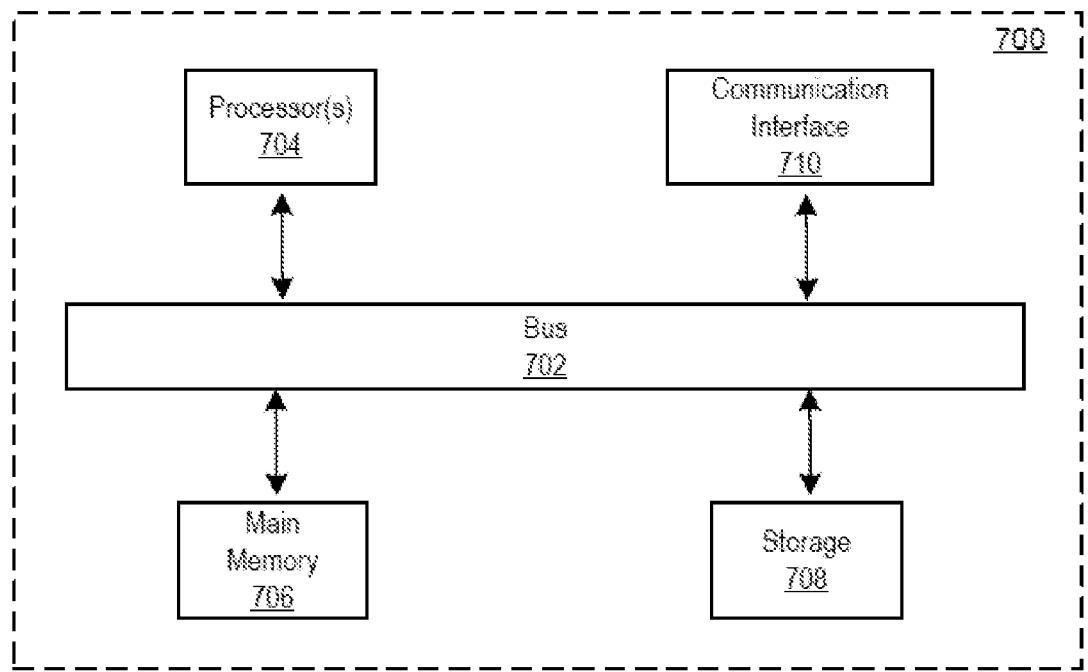
FIG. 7 is a block diagram that illustrates a computer system upon which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein.

For example, the computing system 700 may be used to implement the computing system 102, the information obtaining component 112, the path generation component 114, the path evaluation component 116, and the action selection component 118 shown in FIG. 1. As another example, the process/method shown in FIGS. 5-6 and described in connection with this figure may be implemented by computer program instructions stored in main memory 706. When these instructions are executed by processor(s) 704, they may perform the steps of method 600 as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method for vehicle repositioning, comprising:
obtaining information comprising a current location of a vehicle on a ride-sharing platform;
obtaining a set of paths originated from the current location of the vehicle, wherein each of the set of paths has a length less than a preset maximum path length;
obtaining a set of expected cumulative rewards along the set of paths based on a trained deep value-network, wherein the trained deep value-network is a neural network comprising two jointly trained output branches respectively corresponding to a conditional value function and a marginal value function, the two output branches comprises:
a first output branch in which the conditional value function is trained to predict values based on a current state of the vehicle and a given action, wherein the given action comprises a repositioning action or a staying idle action,
a second output branch in which the marginal value function is trained to predict an expected value based on the current state of the vehicle, and
the deep value-network is trained based on positive samples and negative samples learned from historical driver trajectories, wherein the positive samples represent historical repositioning actions and the negative samples represent the historical idle actions, the positive samples comprise states when a driver receives a trip request, and the negative samples comprise sampling from idle states in-between orders and states when the driver becomes active or inactive;
selecting a best path from the set of paths based on a heuristic tree search of the set of expected cumulative rewards;
delivering an instruction to the vehicle for repositioning along the best path; and
in response to the instruction being acknowledged, instructing the vehicle to launch navigation to provide route guidance.

2. The method of claim 1, wherein the obtaining information comprising a current location comprises:
obtaining a grid-world representing a real world geographical area, wherein the grid-world comprises a plurality of grid cells representing a plurality of order-dispatching regions, wherein the current location of the vehicle comprises a first grid cell in the grid-world, wherein a next step along the best path comprises a second grid cell in the grid-world.

3. The method of claim 2, wherein obtaining the set of paths originated from the current location comprises excluding paths with inaccessible grid cells.

4. The method of claim 1, wherein repositioning is triggered after the vehicle has been idle for a predetermined number of minutes.

5. The method of claim 1, wherein the obtained information further comprises a current time step, and the vehicle is recommended to reposition to a new location corresponding to a next step along the best path at a next time step.

6. The method of claim 5, wherein the trained deep value-network generates the set of expected cumulative rewards based on a repositioning cost of repositioning to the new location and a future value of the new location.

7. The method of claim 6, wherein the future value of the new location is based on a dispatch probability and a future cumulative reward from the new location.

8. The method of claim 1, wherein the method further comprises:
triggering a long search if the vehicle has not been dispatched to an order for a threshold amount of time; and
selecting the repositioning action from a long search look-up table.

9. The method of claim 1, wherein the trained deep value-network is trained within an offline batch reinforcement learning framework.

10. The method of claim 1, wherein the selecting the best path comprises:
constructing a tree structure comprising the current location of the vehicle as a root and a plurality of paths leading to a plurality of leaf nodes representing repositioning targets,
computing, for each of the plurality of leaf nodes, a first value using the conditional value function trained with a first output branch of the neural network, and a second expected value using the marginal value function trained with a second output branch of the neural network,
generating an Q value for the leaf node based on the first value and the second value, and
determining a tree path leading to a leaf node with a largest Q value as the best path.

11. A system for vehicle repositioning comprising one or more processors and one or more non-transitory computer-readable memories coupled to the one or more processors and configured with instructions executable by the one or more processors to cause the system to perform operations comprising:
obtaining information comprising a current location of a vehicle on a ride-sharing platform;
obtaining a set of paths originated from the current location of the vehicle, wherein each of the set of paths has a length less than a preset maximum path length;
obtaining a set of expected cumulative rewards along the set of paths based on a trained deep value-network, wherein the trained deep value-network is a neural network comprising two jointly trained output branches respectively corresponding to a conditional value function and a marginal value function, the two output branches comprises:
a first output branch in which the conditional value function is trained to predict values based on a current state of the vehicle and a given action, wherein the given action comprises a repositioning action or a staying idle action,
a second output branch in which the marginal value function is trained to predict an expected value based on the current state of the vehicle, and
the deep value-network is trained based on positive samples and negative samples learned from historical driver trajectories, wherein the positive samples represent historical repositioning actions and the negative samples represent the historical idle actions, the positive samples comprise states when a driver receives a trip request, and the negative samples comprise sampling from idle states in-between orders and states when the driver becomes active or inactive;
selecting a best path from the set of paths based on a heuristic tree search of the set of expected cumulative rewards;
delivering an instruction to the vehicle for repositioning along the best path; and
in response to the instruction being acknowledged, instructing the vehicle to launch navigation to provide route guidance.

12. The system of claim 11, wherein the obtaining information comprising a current location comprises:
obtaining a grid-world representing a real world geographical area, wherein the grid-world comprises a plurality of grid cells representing a plurality of order-dispatching regions, wherein the current location of the vehicle comprises a first grid cell in the grid-world, wherein a next step along the best path comprises a second grid cell in the grid-world.

13. The system of claim 12, wherein obtaining the set of paths originated from the current location comprises excluding paths with inaccessible grid cells.

14. The system of claim 11, wherein the obtained information further comprises a current time step, and the vehicle is recommended to reposition to a new location corresponding to a next step along the best path at a next time step.

15. The system of claim 14, wherein the trained deep value-network generates the set of expected cumulative rewards based on a repositioning cost of repositioning to the new location and a future value of the new location.

16. The system of claim 15, wherein the future value of the new location is based on a dispatch probability and a future cumulative reward from the new location.

17. The system of claim 11, wherein the trained deep value-network is trained within an offline batch reinforcement learning framework.

18. A non-transitory computer-readable storage medium configured with instructions executable by one or more processors to cause the one or more processors to perform operations comprising:
obtaining information comprising a current location of a vehicle on a ride-sharing platform;
obtaining a set of paths originated from the current location of the vehicle, wherein each of the set of paths has a length less than a preset maximum path length;
obtaining a set of expected cumulative rewards along the set of paths based on a trained deep value-network, wherein the trained deep value-network is a neural network comprising two jointly trained output branches respectively corresponding to a conditional value function and a marginal value function, the two output branches comprises:
a first output branch in which the conditional value function is trained to predict values based on a current state of the vehicle and a given action, wherein the given action comprises a repositioning action or a staying idle action,
a second output branch in which the marginal value function is trained to predict an expected value based on the current state of the vehicle, and
the deep value-network is trained based on positive samples and negative samples learned from historical driver trajectories, wherein the positive samples represent historical repositioning actions and the negative samples represent the historical idle actions, the positive samples comprise states when a driver receives a trip request, and the negative samples comprise sampling from idle states in-between orders and states when the driver becomes active or inactive;
selecting a best path from the set of paths based on a heuristic tree search of the set of expected cumulative rewards;
delivering an instruction to the vehicle for repositioning along the best path; and
in response to the instruction being acknowledged, instructing the vehicle to launch navigation to provide route guidance.

19. The non-transitory computer-readable storage medium of claim 18, wherein the obtaining information comprising a current location comprises:
obtaining a grid-world representing a real world geographical area, wherein the grid-world comprises a plurality of grid cells representing a plurality of order-dispatching regions, wherein the current location of the vehicle comprises a first grid cell in the grid-world, wherein a next step along the best path comprises a second grid cell in the grid-world.

20. The non-transitory computer-readable storage medium of claim 19, wherein obtaining the set of paths originated from the current location comprises excluding paths with inaccessible grid cells.

* * * * *